United States Patent Office 2,889,343
Patented June 2, 1959

2,889,343

NOVEL PROCESS FOR STEROIDAL OXIDATION PRODUCTS

Arthur R. Hanze, Kalamazoo Township, Kalamazoo County, Mich., assignor to The Upjohn Company, Kalamazoo, Mich., a corporation of Michigan No Drawing. Application June 20, 1955
Serial No. 516,753

8 Claims. (Cl. 260—397.45)

This invention relates to a novel process for the oxidation of steroids and is more particularly concerned with the production of 21-acyloxy-17α-hydroxy-4-pregnene-3,11,20-triones (cortisone 21-esters) through selective oxidation of 21-acyloxy-11β,17α,20α-trihydroxy-4-pregnen-3-one with chromic anhydride-heterocyclic amine complexes.

The present process comprises oxidizing a 21-acyloxy-11β,17α,20α-trihydroxy-4-pregnen-3-one (II) wherein the acyloxy group is AcO, Ac being the acyl radical of an organic carboxylic acid containing from one to eight carbon atoms, inclusive, with a suspension of a selected chromic anhydride-heterocyclic amine, illustratively chromic anhydride-pyridine, in an excess of the heterocyclic amine to obtain the corresponding 21-acyloxy-17α-hydroxy-4-pregnene-3,11,20-trione (III) as shown in the equation:

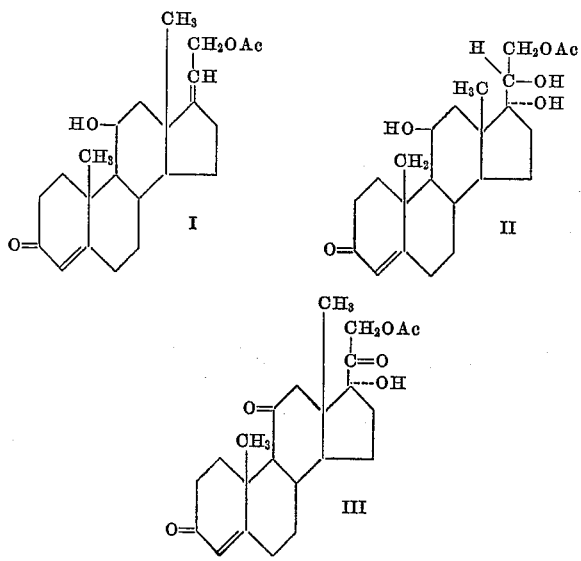

The present starting compounds, 21-acyloxy-11β,17α, 20α-trihydroxy-4-pregnen-3-ones (II) are obtained in the oxidation of 21-acyloxy-11β-hydroxy-4,17(20)-pregnadien-3-ones (I) with osmium tetroxide and triethanolamine oxide. The process of the present invention, the oxidation of 11β,17α,20α-trihydroxy-21-acyloxy-4-pregnen-3-ones (II), with chromic anhydride-heterocyclic amino complexes, is of considerable importance, since the product, 17α-hydroxy-21-acyloxy-4-pregnene-3,11,20-triones (III) (cortisone esters) are known and useful compounds. Oxidation of the 11β- and 20α-hydroxyl groups simultaneously or at least of the 20α-hydroxyl group only to obtain cortisone or Kendall's compound F presented unusual difficulties. For example, N-bromoacetamide oxidized only the 11β-hydroxy group of 11β,17α,20α-trihydroxy-21-acyloxy-4-pregnen-3-one; chromic acid in acetic acid solution oxidized the whole 17β-side-chain and the 11β-hydroxy group of the same compound to give adrenosterone, periodic acid oxidation resulted in various decomposition products such as 11β-hydroxy-4-androstene-3,17-dione, but none of the valuable highly active adrenocortical hormones such as cortisone or hydrocortisone could be obtained. It was therefore surprising to find that the chromic anhydride-heterocyclic amine complexes can convert 21-acyloxy-11β,17α, 20α-trihydroxy-4-pregnene-3,20-dione to the corresponding cortisone ester.

It is an object of the present invention to provide a novel process for the conversion of 21-acyloxy-11β,17α, 20α-trihydroxy-4-pregnen-3-one to the corresponding cortisone 21-organic carboxylic acid ester by a selective oxidation process. Another more specific object is the provision of a novel process for the production of cortisone 21-hydrocarbon carboxylic acid esters, wherein the hydrocarbon carboxylic acid has from one to eight carbon atoms, by a selective oxidation. Other objects will be apparent to those skilled in the art to which this invention pertains.

The starting compounds of the present application are 21-acyloxy - 11β,17α,20α - trihydroxy - 4 - pregnen-3-ones wherein the acyloxy group is AcO, Ac being the acyl radical of an organic carboxylic acid possessing from one to eight carbon atoms, inclusive. It should be noted that the mild reaction conditions do not produce changes in the acyl radical, such as oxidation of double bonds or possible dehydrohalogenation in halo acid acyl radicals, with the exception of a possible oxidation of a secondary alcoholic group to a keto group. Therefore hydrocarbon carboxylic acids as well as other acids may be used. For the purpose of the present invention such an oxidation in the acyl group is, however, inconsequential, since the thus produced cortisone ester is either of direct value or may be hydrolyzed to give cortisone and if desired reesterified by conventional methods to give a cortisone ester with desired properties. The preparation of the starting compound is shown in detail in Preparations 1 through 7. Representative starting compounds thus obtained comprise: 21-formyloxy-11β,17α,20α-trihydroxy-4-pregnen-3-one, 21-acetoxy-11β,17α,20α-trihydroxy-4-pregnen-3-one, 21-propionyloxy-11β,17α,20α-trihydroxy-4-pregnen-3-one, 21-butyryloxy-11β,17α,20α-trihydroxy-4-pregnen-3-one, 21-isobutyryloxy-11β,17α,20α-trihydroxy-4-pregnen-3-one, 21-valeryloxy-11β,17α,20α-trihydroxy - 4 - pregnen-3-one, 21-isovaleryloxy-11β,17α, 20α-trihydroxy-4-pregnen-3-one, 21-hexanoyloxy-11β,17α, 20α-trihydroxy - 4 - pregnen-3-one, 21-heptanoyloxy-11β, 17α,20α-trihydroxy-4-pregnen-3-one, 21-octanoyloxy-11β, 17α,20α-trihydroxy-4-pregnen-3-one, 21-(β-cyclopentylpropionyloxy) - 11β,17α,20α-trihydroxy-4-pregnen-3-one, 21-benzoyloxy-11β,17α,20α-trihydroxy-4-pregnen - 3-one, 21-phenylacetoxy - 11β,17α,20α - trihydroxy-4-pregnen-3-one, 21-toluyloxy-11β,17α,20α-trihydroxy - 4 - pregnen-3-one, 21-(β-bromopropionyloxy)-11β,17α,20α-trihydroxy-4-pregnen - 3 - one, 21-cinnamyloxy - 11β,17α,20α - trihydroxy - 4 - pregnen-3-one, 21-gallyloxy-11β,17α,20α-trihydroxy-4-pregnen - 3 - one, 21 - salicyloxyloxy-11β,17α,20α-trihydroxy-4-pregnen-3-one, 21-anisoyloxy-11β,17α,20α-trihydroxy-4-pregnen-3-one, 21-benzenesulfonyloxy-11β, 17α,20α-trihydroxy-4-pregnen-3-one, 21-parachlorobenzenesulfonyloxy - 11β,17α,20α - trihydroxy-4-pregnen-3-one, 21-toluenesulfonyloxy - 11β,17α,20α - trihydroxy-4-pregnen - 3 - one, 21-benzenephosphonyloxy-11β,17α,20α-trihydroxy-4-pregnen-3-one, 21-trimethylacetoxy-11β,17α, 20α-trihydroxy-4-pregnen-3-one, 21-monochloroacetoxy-11β,17α,20α-trihydroxy-4-pregnen-3-one, 21-dichloroacetoxy-11β,17α,20α-trihydroxy-4-pregnen-3-one, 21-trichloroacetoxy-11β,17α,20α-trihydroxy - 4 - pregnen-3-one, 21-hemiquinolinoyloxy - 11β,17α,20α - trihydroxy-4-pregnen-3-one, 21-nicotinyloxy-11β,17α,20α-trihydroxy-4-pregnen-3-one, 21-piperonyloyloxy-11β,17α,20α-trihydroxy-4-pregnen-3-one, 21-(2-furoyloxy) - 11β,17α,20α - trihydroxy-4-pregnen-3-one, 21-hemitartaryloxy - 11β,17α,20α - trihydroxy-4-pregnen-3-one, 21-hemisuccinyloxy-11β,17α,20α-trihydroxy-4-pregnen-3-one, 21-dihydrogencityloxy-11β,17α,20α-trihydroxy-4-pregnen-3-one, 21-maleyloxy-11β,17α,20α-trihydroxy-4-pregnen-3-one, 21-fumaryloxy-11β,17α,20α-trihydroxy-4-pregnen-3-one, 21-thioglycollyloxy-11β,17α,20α-trihydroxy-4-pregnen-3-one, 21-bromoacetoxy-11β,17α,20α-trihydroxy - 4 - pregnen-3-one, 21-vinylacetoxy-11β,17α,20α-trihydroxy-4-pregnen-3-one, 21-(β-methylcrotonyloxy) - 11β,17α,20α - trihydroxy-4-pregnen-3-one, and the like.

These can be prepared in the same manner as given in Preparation 7 by reacting the starting materials shown in Preparation 5 with triethanolamine oxide, osmium tetroxide, in pyridine solution.

In carrying out the process of the present invention the selected 21-acyloxy-11β,17α,20α-trihydroxy-4-pregnen-3-one is mixed, preferably in a solution of an organic solvent such as the heterocyclic amine used in the preparation of the chromic anhydride-heterocyclic amine complex, for example pyridine, β- or γ-picoline, quinoline, or in an inert solvent such as benzene, chloroform, cyclohexane, toluene, methylene dichloride, ethylene dichloride, chlorobenzene, and the like, with a solution of the chromic anhydride-heterocyclic amine complex. The term chromic anhydride-heterocyclic amine complexes refers to the addition compounds produced by the ability of the nitrogen atom in a nitrogen containing heterocyclic ring system to share its free electrons with chromic anhydride. The empirical formula of these addition compounds shows a combination of one molecule of chromic anhydride with two molecules of an aromatic heterocyclic amine containing the amino nitrogen in a five or six member ring the other ring members being carbon atoms. The heterocyclic ring may have substituents such as alkyl radicals in position of α, β, or γ to the nitrogen atom and/or may be condensed with another ring such as a benzene ring. The preferred complex is a complex of chromic anhydride with pyridine. However other heterocyclic amines such as quinoline, α-, β- or γ-picolines are also useful. The preparation of such chromic anhydride-heterocyclic amine preparations is described in detail by Sisler, Bush and Accountius, J. Am. Chem. Soc., 70, 3827 (1948), and by Sarett, J. Am. Chem. Soc., 75, 423 (1953). It is particularly emphasized that in any preparation of the chromic anhydride-pyridine complex caution should be taken to prevent fire or explosions, which dangers are avoided by adding the chromic anhydride slowly and with mixing to the heterocyclic amine (not the heterocyclic amine to the chromic anhydride), thus avoiding any temporary or local excess of chromic anhydride. Cooling and stirring of the solvent during the addition of chromic anhydride is helpful but not necessary if the additions of chromic anhydride are made in small portions. Usually the ratio of heterocyclic amine to chromic anhydride is from 5 to 20 parts of amine to one part of chromic anhydride. If less than 10 parts of amine are used the amine is preferably diluted with an inert solvent such as benzene, toluene, chloroform, methylene dichloride, chlorobenzene and the like, with benzene or chloroform preferred. The complex formed is only moderately soluble, most of it remaining in suspension or in the form of a slurry. To the slurry or suspension of the chromic anhydride heterocyclic amine is added, under continuous agitation, the solution of the selected 21-acyloxy-11β,17α,20α-trihydroxy-4-pregnen-3-one. The reaction temperature is preferably between about minus ten and plus fifty degrees centigrade although lower or higher temperatures are operative. In the preferred embodiment of the invention, the solution containing the steroid is added dropwise under continuous stirring to the suspension of the chromic anhydride-heterocyclic complex at a temperature between about ten to about thirty degrees centigrade. After the addition is completed the reaction mixture is stirred at room temperature, between twenty and thirty degrees centigrade, for sixteen hours. The reaction mixture is then poured into a large excess of water and the steroids, thus produced, are separated from the reaction mixture by conventional means, such as illustratively by extraction with water-immiscible solvents, for example, ether, benzene, chloroform, methylene dichloride, and the like. From the extractives containing the desired cortisone esters as well as other steroid by-products, the cortisone ester is separated by conventional methods illustratively chromatography as shown in the examples. Usually chromatography furnishes cortisone esters in sufficiently pure quality to make recrystallization unnecessary.

The following examples are illustrative of the process and products of the present invention, but are not to be construed as limiting.

PREPARATION 1

*3,11-diketo-4,17(20)-pregnadien-21-oic acid methyl ester*

One milliliter of bromine (3.09 grams) was added dropwise to a stirred solution of 4.50 grams (0.01 mole) of sodium enolate of 11-keto-21-ethoxyoxalyl progesterone, prepared in the manner shown in U.S. Patent 2,683,724, and two grams of potassium acetate, dissolved in 150 milliliters of methanol. When the addition was complete, 3.24 grams of sodium methoxide in forty milliliters of methanol was added thereto, and the whole was maintained at about 25 degrees centigrade for sixteen hours. The reaction mixture was then mixed with a large volume of water and the whole was extracted successively with one portion of benzene and two portions of methylene chloride. The combined extracts were dried over anhydrous sodium sulfate and the solvent was then removed by distillation. The residue was dissolved in 100 milliliters of methylene chloride and chromatographed over and eluted from 150 grams of Florisil synthetic magnesium silicate with methylene chloride containing increasing amounts of acetone. The methylene chloride plus five percent acetone eluates contained 1.2 grams of 3,11-diketo-4,17(20)-pregnadien-21-oic acid methyl ester, melting at 155 to 188 degrees centigrade. Recrystallization of these crystals from a mixture of acetone plus Skellysolve B hexane hydrocarbons gave crystals melting at 207 to 212 degrees centigrade.

PREPARATION 2

*3-ethylene glycol ketal of 3,11-diketo-4,17(20)-pregnadien-21-oic acid methyl ester*

To a solution of 1.5 grams (0.0042 mole) of 3,11-diketo-4,17(20)-pregnadiene-21-oic acid methyl ester, dissolved in 150 milliliters of benzene, was added 7.5 milliliters of ethylene glycol and 0.150 gram of para-toluenesulfonic acid and the whole was then heated with stirring at the reflux temperature of the reaction mixture for 5.5 hours. The cooled reaction mixture was washed with 100 milliliters of a one percent aqueous sodium bicarbonate solution. The benzene layer was then poured on a column of 150 grams of Florisil synthetic magnesium silicate. The column was developed with 100-milliliter portions of solvents of the following composition and order: eight portions of methylene chloride and three portions of methylene chloride plus four percent acetone. The methylene chloride eluates contained 1.08 grams of the 3-ethylene glycol ketal of 3,11-diketo-4,17(20)-pregnadien-21-oic acid methyl ester, which upon recrystallization from a mixture of ethyl acetate and Skellysolve B hexane hydrocarbons melted at 188 to 190 degree centigrade and had the anlysis given below. The methylene chloride plus four percent acetone eluates contained 0.390 gram of pure starting 3,11-diketo-4,17(20)-pregnadien-21-oic acid methyl ester. The yield of product was 87 percent of the theoretical calculated on the amount of starting steroid which reacted.

*Analysis.*—Calcd. for $C_{24}H_{32}O_5$: C, 71.94; H, 8.05. Found: C, 71.90; H, 7.95.

PREPARATION 3

*3-ethylene glycol ketal of 11β,21-dihydroxy-4,17(20)-pregnadien-3-one*

A solution of 1.50 grams of the 3-ethylene glycol ketal of 3,11-diketo-4,17(20)-pregnadien-21-oic acid methyl ester in seventy milliliters of benzene was added dropwise to a stirred mixture of 1.50 grams of lithium aluminum hydride and fifty milliliters of anhydrous ether. When addition was complete, the reaction mixture was refluxed for one-half hour whereafter the mixture was cooled to room temperature. Fifty milliliters of water was then cautiously added to the stirred reaction mixture to decompose the excess lithium aluminum hydride, followed by 200 milliliters of methylene chloride. The whole was then centrifuged to facilitate separation of the organic and aqueous phases. The organic phase was separated, the solvent distilled and the white crystalline distillation residue was crystallized from a mixture of ethyl acetate and Skellysolve B hexane hydrocarbons to yield 1.003 grams, a yield of 72 percent of the theoretical, of crystalline 3-ethylene glycol ketal of 11β,21-dihydroxy-4,17(20)-pregnadien-3-one in two crops. The first crop, the analysis of which is given below, melted at 191 to 194 degrees centigrade and the second, at 172 to 180 degrees centigrade.

*Analysis.*—Calcd. for $C_{23}H_{34}O_4$: C, 73.76; H, 9.15. Found: C, 73.87; H, 9.22.

PREPARATION 4

*11β,21-dihydroxy-4,17(20)-pregnadien-3-one*

A solution of 0.572 gram (0.0015 mole) of the 3-ethylene glycol ketal of 11β,21-dihydroxy-4,17(20)-pregnadien-3-one in forty milliliters of acetone was diluted with water to a volume of fifty milliliters and eight drops of concentrated sulfuric acid was then added thereto, whereafter the reaction mixture was kept at room temperature for 24 hours. The reaction mixture was then made alkaline by the addition of a saturated aqueous sodium bicarbonate solution and the acetone was then evaporated from the mixture. Methylene chloride and more water were then added, the methylene chloride layer removed, and the solvent distilled therefrom. The residue, after drying in vacuo, consisted of the theoretical 0.518 gram of 11β,21-dihydroxy-4,17(20)-pregnadien-3-one.

PREPARATION 5

*21-acetoxy-11β-hydroxy-4,17(20)-pregnadien-3-one*

A solution of 0.518 gram of 11β,21-dihydroxy-4,17(20)-pregnadien-3-one in five milliliters of pyridine was mixed with two milliliters of acetic anhydride and the whole was then maintained at room temperature for seventeen hours whereafter crushed ice was added thereto. The precipitated 21-acetoxy-11β-hydroxy-4,17(20)-pregnadien-3-one was filtered therefrom, dissolved in benzene and then chromatographed over a column of 75 grams of Florisil synthetic magnesium silicate. The column was developed with 75-milliliter portions of solvents of the following composition and order: benzene, three portions each of Skellysolve B hexane hydrocarbons plus one percent acetone, Skellysolve B plus five percent acetone, Skellysolve B plus ten percent acetone, Skellysolve B plus fifteen percent actone, Skellysolve B plus twenty percent acetone, and finally, two portions of acetone. The eluate fractions containing ten percent and fifteen percent acetone, respectively, were combined, the solvent removed therefrom and the crystalline residue was crystallized from a mixture of ethyl acetate and Skellysolve B to yield as the first crop 0.253 gram, a yield of 45 percent of the theoretical, of 21-acetoxy-11β-hydroxy-4,17(20)-pregnadien-3-one melting at 183 to 186 degrees centigrade.

*Analysis.*—Calcd. for $C_{23}H_{32}O_4$: C, 74.16; H, 8.66. Found: C, 74.18; C, 73.95; H, 8.45; H, 8.74.

Other esters of 11β,21-dihydroxy-4,17(20)-pregnadien-3-one are prepared by reacting 11β,21-dihydroxy-4,17(20)-pregnadien-3-one (Preparation 4) with an acid anhydride or an acyl halide such as an acyl bromide or an acyl chloride of the selected acid to obtain the corresponding 21-ester. In the case of formic acid the 11β, 21-dihydroxy-4,17(20)-pregnadien-3-one is dissolved in 98 percent formic acid and an esterification catalyst such as toluenesulfonic acid or a few drops of sulfuric acid are added to the mixture. In this manner the following 21-esters of 11β,21-dihydroxy-4,17(20)-pregnadien-3-one are prepared: 21-formate, propionate, butyrate, isobutyrate, valerate, isovalerate, hexanoate, heptanoate, octanoate, β-cyclopentylpropionate, benzoate, phenylacetate, toluate, cinnamate, gallate, salicylate, anisate, benzenesulfonate, para-chlorobenzenesulfonate, toluenesulfonate, benzenephosphonate, trimethylacetate, monochloroacetate, dichloroacetate, trichloroacetate, hemiquinolinate, nicotinate, piperonate, 2-furoate, hemisuccinate, hemitartrate, dihydrogencitrate, maleate, fumarate, thioglycollate, bromoacetate, crotonate, β-methylcrotonate of 11β, 21-dihydroxy-4,17(20)-pregnadien-3-one, and the like.

PREPARATION 6

*Triethanolamine oxide*

To 74.6 grams (0.50 mole) of triethanolamine was added with stirring 34 grams (0.50 mole) of a fifty percent aqueous solution of hydrogen peroxide over a period of thirteen minutes. The temperature of the mixture rose to forty degrees centigrade. After the reaction mixture was maintained at room temperature for 24 hours, it was diluted with fifty milliliters of water containing a small amount of catalase, causing a small amount of gas to evolve from the mixture. The resulting solution was distilled at about sixty to seventy degrees centigrade at reduced pressure leaving a crystalline residue. The residue was triturated with 200 milliliters of hot acetone. The resulting slurry was cooled and the crystals filtered therefrom. The crystalline triethanolamine oxide thus-obtained melted at 103 to 105 degrees centigrade and gave no titration with ceric sulfate, a reagent sensitive to hydrogen peroxide [Jones and Burns, J. Am. Chem. Soc., 47, 2966 (1935)].

PREPARATION 7

*21-acetoxy-11β,17α,20α-trihydroxy-4-pregnen-3-one*

A. HYDROXYLATION WITH TRIETHANOLAMINE OXIDE

A mixture of 372 milligrams (1.0 millimole) of 11β-hydroxy-21-acetoxy-4,17(20)-pregnadien-3-one, 3.7 milligrams of osmium tetroxide ($OsO_4$) and 0.5 milliliter of pyridine in twenty milliliters of tertiary butyl alcohol containing about 0.1 percent water was stirred for one hour and 496 milligrams (3.0 millimoles) of triethanolamine oxide was then added. The resulting mixture was stirred for twenty hours at room temperature (twenty to thirty degrees centigrade). Twenty milliliters of an 0.5 percent aqueous solution of $Na_2SO_3$ was added and the mixture stirred for one-half hour. The solution was concentrated to fifteen milliliters by distillation at reduced pressure and then extracted with four fifty-milliliter portions of methylene chloride, the methylene chloride solution was dried and then poured over thirty grams of acid-washed alumina in a column. The column was developed with methylene chloride containing increasing amounts of acetone. There was recovered 344 milligrams of steroid from the column, of which 238 milligrams was starting material and 106 milligrams was 21-acetoxy-11β,17α,20α-trihydroxy-4-pregnen-3-one. The yield of hydroxylated steroid, calculated on the starting steroid which reacted, was eighty percent of the theoretical.

EXAMPLE 1

21 - acetoxy - 17α - hydroxy - 4 - pregnene - 3,11,20-trione (cortisone acetate) from 21-acetoxy-11β,17α,20α-trihydroxy-4-pregnen-3-one A suspension of a chromic acid-pyridine complex was prepared by adding 9.74 grams (97.4 millimoles) of chromic anhydride portionwise with stirring and cooling (to about fifteen to 25 degrees centigrade) to 100 milliliters of pyridine. To this suspension was added, under stirring, 4.87 grams (12.0 millimoles) of 21-acetoxy-11β,17α,20α-trihydroxy-4-pregnen-3-one (Preparation 7) in fifty milliliters of pyridine. The mixture which became almost completely homogeneous was stirred for a period of 16 hours at a temperature from twenty to 25 degrees centigrade. The reaction mixture thereafter was poured into 600 milliliters of water and extracted with 150 milliliters of methylene chloride. The addition of methylene chloride to the aqueous reaction mixture formed an emulsion which was separated by filtering the mixture through celite 545 diatomaceous earth used as a filter aid and as a filter bed. The layers were separated and the aqueous layer extracted three more times with addition of 350 milliliters of methylene chloride. The total methylene chloride extracts were washed twice with water, dried with anhydrous sodium sulfate, filtered and the solvent was then volatilized to give 4.94 grams of residue. The solid was taken up in acetone, treated with five grams of Magnesol magnesium silicate, filtered and concentrated to give a crystalline residue of 3.64 grams. This material was separated by chromatography yielding approximately 47 percent of cortisone acetate and 35 percent of 21-acetoxy-17α,20α-dihydroxy-4-pregnene-3,11-dione, the remainder being adrenosterone. For the chromatographic separation, one gram of the 3.64 grams of crude yield was redissolved in methylene dichloride and chromatographed over forty grams of hydrochloric acid washed alumina. Fractions of forty milliliters were collected as indicated in the table.

TABLE I

| Fraction | Solvent | Eluate solids in milligrams |
| --- | --- | --- |
| 1 | Methylene chloride | 1 |
| 2 | do | 9 |
| 3 | do | 35 |
| 3a | do | 35 |
| 4 | Methylene chloride-acetone 99:1 | 33 |
| 5 | do | 33 |
| 6 | do | 18 |
| 7 | Methylene chloride-acetone 97:3 | 8 |
| 8 | do | 13 |
| 9 | do | 35 |
| 10 | Methylene chloride-acetone 95:5 | 38 |
| 11 | do | 48 |
| 12 | do | 37 |
| 13 | Methylene chloride-acetone 93:7 | 28 |
| 14 | do | 30 |
| 15 | do | 12 |
| 16 | Methylene chloride-acetone 9:1 | 13 |
| 17 | do | 12 |
| 18 | do | 11 |
| 19 | Methylene chloride-acetone 17:3 | 10 |
| 20 | do | 25 |
| 21 | do | 27 |
| 22 | Methylene chloride-acetone 8:2 | 28 |
| 23 | do | 36 |
| 24 | do | 21 |
| 25 | Methylene chloride-acetone 7:3 | 18 |
| 26 | do | 16 |
| 27 | do | 7 |
| 28 | Methylene chloride-acetone 6:4 | 7 |
| 29 | do | 7 |
| 30 | do | 19 |
| 31 | Methylene chloride-acetone 4:6 | 53 |
| 32 | do | 77 |
| 33 | do | 35 |
| 34 | Acetone-methanol 19:1 | 160 |
| 35 | do | |
| 36 | do | |
| | | 995 |

Fractions 1 to 7 consisted of adrenosterone. Fractions 8 through 28 inclusive consisted of cortisone acetate. Fractions 8 through 28 inclusive were evaporated and the residue recrystallized from ethyl acetate-Skellysolve B hexanes to yield 435 milligrams of cortisone acetate. Fractions 29 to 34 inclusive consisted out of 21-acetoxy-17α,20α-dihydroxy-4-pregnene-3,11-dione.

EXAMPLE 2

21 - propionyloxy - 17α - hydroxy - 4 - pregnene - 3,11,20-trione from 11β,17α,20α-trihydroxy-21-propionyloxy-4-pregnen-3-one 0.5 gram of 21-propionyloxy-11β,17α,20α-trihydroxy-4-pregnen-3-one, dissolved in pyridine, was added to a suspension of two grams of chromic anhydride in twenty milliliters of pyridine. The mixture was stirred at fifteen degrees of centigrade for a period of 24 hours whereafter the excess chromic anhydride-pyridine complex was destroyed by addition of hydrochloric acid and sodium bisulfite, keeping the temperature of the reaction mixture low by the addition of crushed ice. The organic material was then extracted with methylene chloride and chromatographed as shown in Example 1 to yield cortisone 21-propionate.

EXAMPLE 3

21 - butyryloxy - 17α - hydroxy - 4 - pregnene - 3,11,20-trione from 21-butyryloxy-11β,17α,20α-trihydroxy-4-pregnen-3-one In the manner shown in Example 1, 21-butyryloxy-11β,17α,20α-trihydroxy-4-pregnen-3-one was oxidized with the chromic anhydride β-picoline complex, prepared as shown by Sisler et al., J. Am. Chem. Soc., 70, 3827 (1948), and the resulting 21-butyryloxy-17α-hydroxy-4-pregnene-3,11,20-trione (cortisone 21-butyrate) recovered.

EXAMPLE 4

21-isobutyryloxy-17α-hydroxy-4-pregnen-3,11,20 - trione (cortisone-21-isobutyrate) from 21-isobutyryloxy-11β,17α,20α-trihydroxy-4-pregnen-3-one In the manner shown in Example 1, 21-isobutyryloxy-11β,17α,20α-trihydroxy-4-pregnen-3-one was oxidized with the chromic anhydride-β-picoline complex prepared as shown by Sisler et al., J. Am. Chem. Soc., 70, 3827 (1948), and the resulting 21-isobutyryloxy-17α-hydroxy-4-pregnene-3,11,20-trione (cortisone 21-isobutyrate) recovered.

EXAMPLE 5

21-valeryloxy-17α-hydroxy-4-pregnene - 3,11,20 - trione from 21-valeryloxy-11β,17α,20α-trihydroxy-4-pregnen-3-one In the manner shown in Example 1, 21-valeryloxy-11β,17α,20α - trihydroxy-4-pregnen-3-one was oxidized with the chromic anhydride-γ-picoline complex prepared as shown by Sisler et al., J. Am. Chem. Soc., 70, 3827 (1948), and the resulting 21-valeryloxy-17α-hydroxy-4-pregnene-3,11,20-trione (cortisone 21-valerate) recovered.

EXAMPLE 6

21-isovaleryloxy-17α-hydroxy-4-pregnene-3,11,20 - trione from 21-isovaleryloxy-11β,17α,20α-trihydroxy-4-pregnen-3-one.

In the manner shown in Example 1, 21-isovaleryloxy-11β,17α,20α - trihydroxy-4-pregnen-3-one was oxidized with the chromic anhydride pyridine complex and the resulting 21-isovaleryloxy-17α-hydroxy-4-pregnen-3,11,20-trione (cortisone 21-isovalerate) recovered.

EXAMPLE 7

21-hexanoyloxy-17α-hydroxy-4-pregnene-3,11,20 - trione from 21 - hexanoyloxy-11β,17α,20α-trihydroxy-4-pregnen-3-one In the manner shown in Example 2, 21-hexanoyloxy-11β,17α,20α - trihydroxy-4-pregnen-3-one was oxidized with the chromic anhydride pyridine complex and the resulting 21-hexanoyloxy-17α-hydroxy-4-pregnene-3,11,20-trione (cortisone 21-hexanoate) recovered.

EXAMPLE 8

*21-heptanolyoxy-17α-hydroxy-4-pregnene - 3,11,20-trione from 21-valeryloxy-11β,17α,20α-trihydroxy-4-pregnennen-3-one*

In the manner shown in Example 2, 21-heptanoyloxy-11β,17α,20α - trihydroxy-4-pregnen-3-one was oxidized with the chromic anhydride-quinoline complex prepared as shown by Sisler et al., J. Am. Chem. Soc., 70, 3827 (1948), and the resulting 21-heptanoyloxy-17α-hydroxy 4-pregnene-3,11,20-trione (cortisone 21-heptanoate) recovered.

EXAMPLE 9

*21 - octanoyloxy-17α-hydroxy-4-pregnene - 3,11,20-trione from 21 - octanoyloxy-11β,17α,20α-trihydroxy-4-pregnen-3-one*

In the manner shown in Example 2, 21-octanoyloxy-11β,17α,20α - trihydroxy-4-pregnen-3-one was oxidized with the chromic anhydride-pyridine complex and the resulting 21-octanoyloxy-17α-hydroxy-4-pregnene-3,11,20-trione (cortisone 21-octanoate) recovered.

EXAMPLE 10

*21-benzoyloxy-17α-hydroxy-4-pregnene - 3,11,20 - trione from 21 - benzoyloxy - 11β,17α,20α-trihydroxy-4-pregnen-3-one*

In the manner shown in Example 1, 21-benzoyloxy-11β,17α,20α - trihydroxy-4-pregnen-3-one was oxidized with chromic anhydride-pyridine complex and the resulting 21-benzoyloxy-17α-hydroxy-4-pregnene-3,11,20-trione (cortisone 21-benzoate) recovered.

EXAMPLE 11

*21-(β-cyclopentylpropionyloxy)-17α - hydroxy - 4 - pregnene-3,11,20-trione from 21-(β-cyclopentylpropionyloxy)-11β,17α,20α-trihydroxy-4-pregnen-3-one*

In the manner shown in Example 1, 21-(β-cyclopentylpropionyloxy)-11β,17α,20α - trihydroxy-4-pregnen-3-one was oxidized with the chromic anhydride pyridine complex and the resulting 21-(β-cyclopentylpropionyloxy)-17α-hydroxy-4-pregnene-3,11,20-trione [cortisone 21-(β-cyclopentylpropionate)] recovered.

EXAMPLE 12

*21-(2-furoyloxy)-17α-hydroxy-4-pregnene-3,11,20 - trione from 21-(2-furoyloxy)-11β,17α,20α-trihydroxy-4-pregnen-3-one*

In the manner shown in Example 1, 21-(2-furoyloxy)-11β,17α,20α - trihydroxy-4-pregnen-3-one was oxidized with the chromic anhydride pyridine complex and the resulting 21-(2-furoyloxy)-17α-hydroxy-4-pregnene-3,11,20-trione [cortisone 21-(2-furoate)] recovered.

EXAMPLE 13

*21-bromoacetoxy-17α-hydroxy-4-pregnene-3,11,20 - trione from 21-bromoacetoxy-11β,17a,20α-trihydroxy-4-pregnen-3-one*

In the manner shown in Example 2, 21-bromoacetoxy-11β,17α,20α - trihydroxy-4-pregnen-3-one was oxidized with the chromic anhydride pyridine complex and the resulting 21-bromoacetoxy-17α-hydroxy-4-pregnene-3,11,20-trione (cortisone 21-bromoacetate) recovered.

EXAMPLE 14

*21 - nicotinyloxy-17α-hydroxy-4-pregnene,3,11,20 - trione (cortisone 21-nicotinate) from 21-nicotinyloxy-11β,17α,20α-trihydroxy-4-pregnen-3-one*

In the manner shown in Example 1, 21-nicotinyloxy-11β,17α,20α - trihydroxy-4-pregnen-3-one was oxidized with the chromic anhydride pyridine complex and the resulting 21-nicotinyloxy-17α-hydroxy-4-pregnene-3,11,20-trione (cortisone 21-nicotinate) recovered.

EXAMPLE 15

*21-salicyloyl-17α-hydroxy-4-pregnene-3,11,20-trione from 21-salicyloyl-11β-17α,20α-trihydroxy-4-pregnen-3-one*

In the manner shown in Example 1, 21-salicyloyl-11β,17α,20α-trihydroxy-4-pregnen-3-one was oxidized with the chromic anhydride pyridine complex and the resulting 21-salicyloyl-17α-hydroxy-4-pregnene-3,11,20-trione (cortisone 21-salicylate) recovered.

EXAMPLE 16

*21-toluenesulfonyloxy-17α-hydroxy-4-pregnene - 3,11,20-trione from 21-toluenesulfonyloxy-11β,17α,20α-trihydroxy-4-pregnen-3-one*

In the manner shown in Example 2, 21-toluenesulfonyloxy - 11β,17α,20α-trihydroxy-4-pregnen-3-one was oxidized with the chromic anhydride pyridine complex and the resulting 21-toluene-sulfonyloxy-17α-hydroxy-4-pregnene-3,11,20-trione (cortisone 21-toluenesulfonate) recovered.

EXAMPLE 17

*21 - hemisuccinyloxy - 17α - hydroxy - 4 - pregnene - 3,11,20-trione from 21-hemisuccinyloxy-11β,17α,20α-trihydroxy-4-pregnen-3-one*

In the manner shown in Example 1, 21-hemisuccinyloxy-11β,17α,20α-trihydroxy-4-pregnen-3-one was oxidized with the chromic anhydride pyridine complex and the resulting 21-hemisuccinyloxy-17α-hydroxy-4-pregnene-3,11,20-trione (cortisone 21-hemisuccinate) recovered.

EXAMPLE 18

*21 - cinnamyloxy - 17α - hydroxy - 4 - pregnene - 3,11,20-trione from 21 - cinnamyloxy - 11β,17α,20α - trihydroxy-4--pregnen-3-one*

In the manner shown in Example 1, 21-cinnamyloxy-11β,17α,20α-trihydroxy - 4 - pregnen-3-one was oxidized with the chromic anhydride α-picoline complex and the resulting 21-cinnamyloxy-17α-hydroxy-4-pregnene-3,11,20-trione (cortisone 21-cinnamate) recovered.

EXAMPLE 19

*21 - trichloroacetoxy - 17α - hydroxy - 4 - pregnene - 3,11,20-trione from 21-trichloroacetoxy-11β,17α,20α-trihydroxy-4-pregnen-3-one*

In the manner shown in Example 2, 21-trichloroacetoxy - 11β,17α,20α - trihydroxy - 4 - pregnen-3-one was oxidized with the chromic anhydride-β-picoline complex and the resulting 21-trichloroacetoxy-17α-hydroxy-4-pregnene-3,11,20-trione (cortisone 21-trichloroacetate) recovered.

EXAMPLE 20

*21 - thioglycolyloxy - 17α - hydroxy - 4 - pregnene - 3,11,20-trione from 21-thioglycolyloxy-11β,17α,20α-trihydroxy-4-pregnen-3-one*

In the manner shown in Example 1, 21-thioglycolyloxy-11β,17α,20α-trihydroxy-4-pregnen-3-one was oxidized with the chromic anhydride-quinoline complex and the resulting 21-thioglycolyloxy-17α-hydroxy-4-pregnene-3,11,20-trione (cortisone 21-thioglycollate) recovered.

In the manner described in Examples 1 through 20 by oxidizing a 21-acyloxy-11β,17α,20α-trihydroxy-4-pregnen-3-one wherein the acyloxy group is AcO, Ac being the acyl radical of an organic carboxylic acid possessing from one to eight carbon atoms, with a chromic anhydride-heterocyclic amine complex, other 21-acylates of cortisone are obtained, illustratively: the cortisone 21-formate, phenylacetate, toluate, gallate, anisate, benzenesulfonate, para-chlorobenzenesulfonate, benzenephosphonate, trimethylacetate, monochloroacetate, dichloroacetate, hemiquinolinate, piperonate, hemitartrate, dihydrogen citrate, maleate, fumarate, crotonate, β-methylcrotonate, or the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A process for the production of a 21-acyloxy-17α-hydroxy-4-pregnene-3,11,20-trione wherein the acyloxy group is AcO, Ac being the acyl radical of an organic carboxylic acid containing from one to eight carbon atoms, inclusive, which comprises: oxidizing a 21-acyloxy-11β,17α,20α-trihydroxy-4-pregnen-3-one wherein the acyloxy group is defined as above with a suspension of a chromic anhydride-heterocyclic amine complex to obtain the corresponding 21-acyloxy-17α-hydroxy-4-pregnene-3,11,20-trione.

2. A process for the production of a 21-acyloxy-17α-hydroxy-4-pregnene-3,11,20-trione wherein the acyloxy group is AcO, Ac being the acyl radical of an organic carboxylic acid, containing from one to eight carbon atoms, inclusive, which comprises: oxidizing a 21-acyloxy-11β,17α,20α-trihydroxy-4-pregnen-3-one wherein the acyloxy group is defined as above with a suspension of chromic anhydride-pyridine complex to obtain the corresponding 21-acyloxy-17α-hydroxy-4-pregnene-3,11,20-trione.

3. A process for the production of a 21-acyloxy-17α-hydroxy-4-pregnene-3,11,20-trione wherein the acyloxy group is AcO, Ac being the acyl radical of a hydrocarbon carboxylic acid, containing from one to eight carbon atoms, inclusive, which comprises: oxidizing a 21-acyloxy-11β,17α,20α-trihydroxy-4-pregnen-3-one wherein the acyloxy group is defined as above with a suspension of chromic anhydride-pyridine complex at a temperature between about minus ten and about plus fifty degrees centigrade to obtain the corresponding 21-acyloxy-11α-hydroxy-4-pregnen-3,11,20-trione.

4. A process for the production of 21-acetoxy-17α-hydroxy-4-pregnene-3,11,20-trione which comprises: oxidizing 21-acetoxy - 11β,17α,20α-trihydroxy-4-pregnen-3-one with a suspension of chromic anhydride-pyridine complex at a temperature between about fifteen and about thirty degrees centigrade to obtain 21-acetoxy-17α-hydroxy-4-pregnene-3,11,20-trione.

5. A process for the production of 21-propionyloxy-17α-hydroxy-4-pregnene-3,11,20-trione which comprises: oxidizing 21-propionyloxy-11β,17α,20α-trihydroxy-4-pregnen-3-one with a suspension of chromic anhydride-pyridine complex at a temperature between about fifteen and about thirty degrees centigrade to obtain 21-propionyloxy-17α-hydroxy-4-pregnene-3,11,20-trione.

6. A process for the production of 21-benzoyloxy-17α-hydroxy-4-pregnene-3,11,20-trione which comprises: oxidizing 21-benzoyloxy-11β,17α,20α-trihydroxy-4-pregnen-3-one with a suspension of chromic anhydride-pyridine complex at a temperature between about fifteen and about thrity degrees centigrade to obtain 21-benzoyloxy-17α-hydroxy-4-pregnene-3,11,20-trione.

7. A process for the production of 21-(β-cyclopentylpropionyloxy)-17α-hydroxy-4-pregnene - 3,11,20 - trione which comprises: oxidizing 21-(β-cyclopentylpropionyloxy)-11β,17α,20α-trihydroxy-4-pregnen-3-one with a suspension of chromic anhydride-pyridine complex at a temperature between about fifteen and about thirty degrees centigrade to obtain 21-(β-cyclopentylpropionyloxy)-17α-hydroxy-4-pregnene-3,11,20-trione.

8. A process for the production of 21-salicyloyloxy-17α-hydroxy-4-pregnene-3,11,20-trione which comprises: oxidizing 21-salicyloyloxy-11β,17α,20α-trihydroxy-4-pregnen-3-one with a suspension of chromic anhydride-pyridine complex at a temperature between about fifteen and about thirty degrees centigrade to obtain 21-salicyloyloxy-17α-hydroxy-4-pregnene-3,11,20-trione.

References Cited in the file of this patent

UNITED STATES PATENTS

| | | |
|---|---|---|
| 2,094,045 | Schoeller | Sept. 28, 1937 |
| 2,678,933 | Meister | May 18, 1954 |
| 2,697,110 | Murray | Dec. 14, 1954 |
| 2,701,808 | Hogg | Feb. 8, 1955 |
| 2,752,369 | Holysz et al. | June 26, 1956 |

OTHER REFERENCES

Sisler: Jour. Am. Chem. Soc., 70, 3827–30 (1948).

Fieser et al.: Natural Products Related to Phenanthrene, 3rd ed., pages 408–10 (1949).

Ser. No. 385,680, Vargha et al. (A.P.C.), published Apr. 20, 1943.